A. R. BALDWIN.
AUXILIARY PLANTER.
APPLICATION FILED MAR. 22, 1911.
1,011,010.
Patented Dec. 5, 1911.
3 SHEETS—SHEET 2.
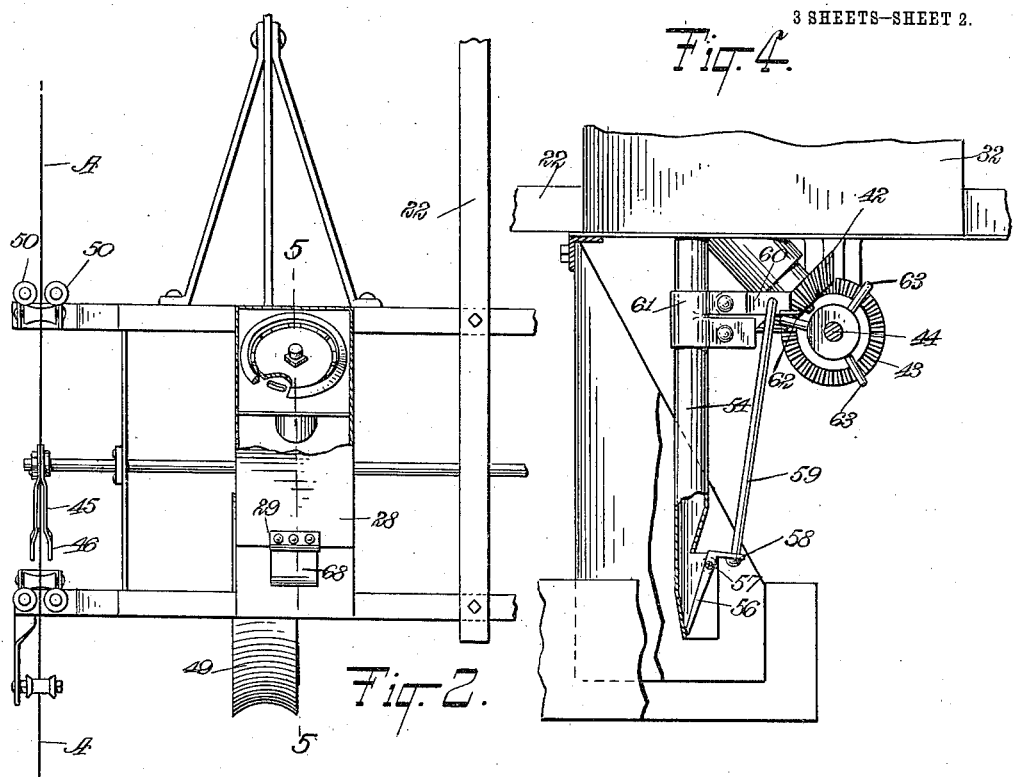
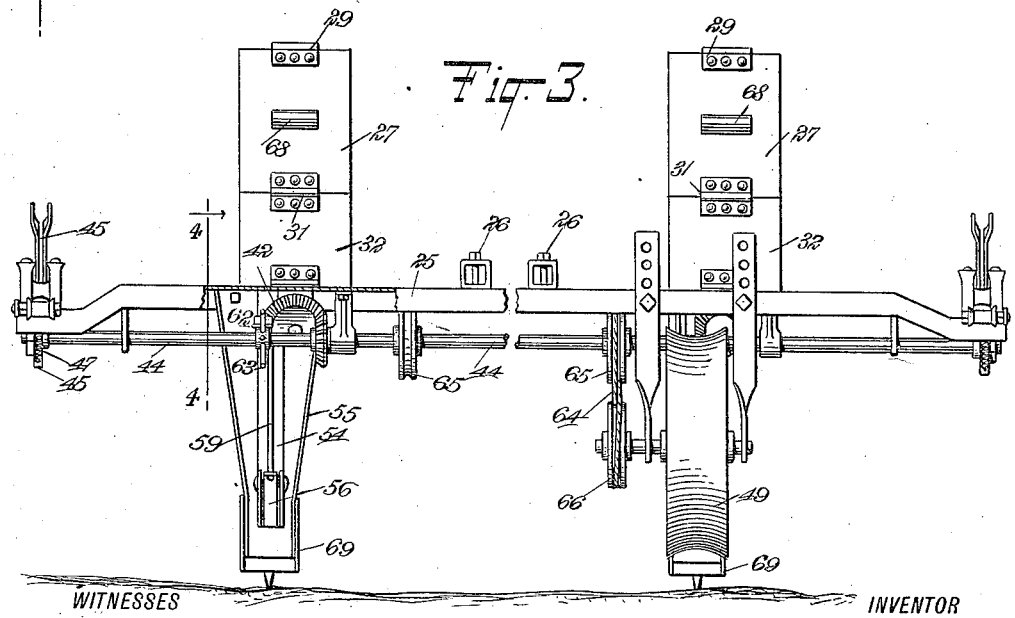
WITNESSES
George Bambay
INVENTOR
Alfred R. Baldwin
BY Munn & Co.
ATTORNEYS

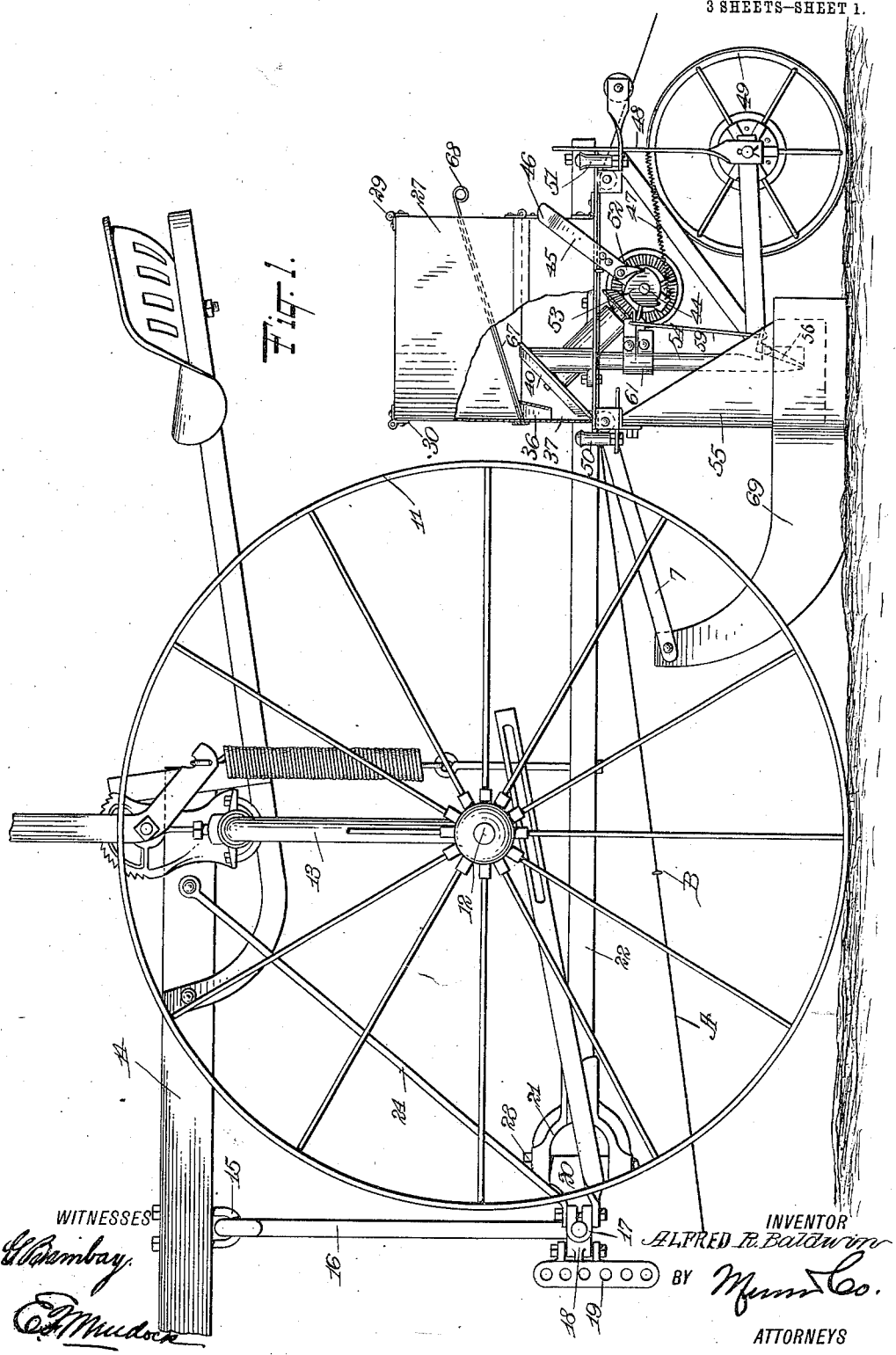

A. R. BALDWIN.
AUXILIARY PLANTER.
APPLICATION FILED MAR. 22, 1911.

1,011,010.

Patented Dec. 5, 1911.

3 SHEETS—SHEET 3.

WITNESSES
George Bambay
C. F. Murdock

INVENTOR
Alfred R. Baldwin
BY Munn & Co.
ATTORNEYS

UNITED STATES PATENT OFFICE.

ALFRED RITCHIE BALDWIN, OF SPRINGFIELD, MISSOURI.

AUXILIARY PLANTER.

1,011,010.  Specification of Letters Patent.  Patented Dec. 5, 1911.

Application filed March 22, 1911. Serial No. 616,050.

*To all whom it may concern:*

Be it known that I, ALFRED R. BALDWIN, a citizen of the United States, and a resident of Springfield, in the county of Greene and State of Missouri, have invented a new and Improved Auxiliary Planter, of which the following is a full, clear, and exact description.

Among the principal objects which the present invention has in view are: to provide an implement of the character mentioned which may be attached for traction purposes to any other implement or conveyance to be operated independently or in conjunction therewith; and to provide an implement of the character mentioned having a seed dropping mechanism operable in conjunction with a check wire or independently, being impelled thereto by its own carrying wheels.

One embodiment of the present invention is disclosed in the structure illustrated in the accompanying drawings, in which like characters of reference denote corresponding parts in all the views, and in which—

Figure 5:
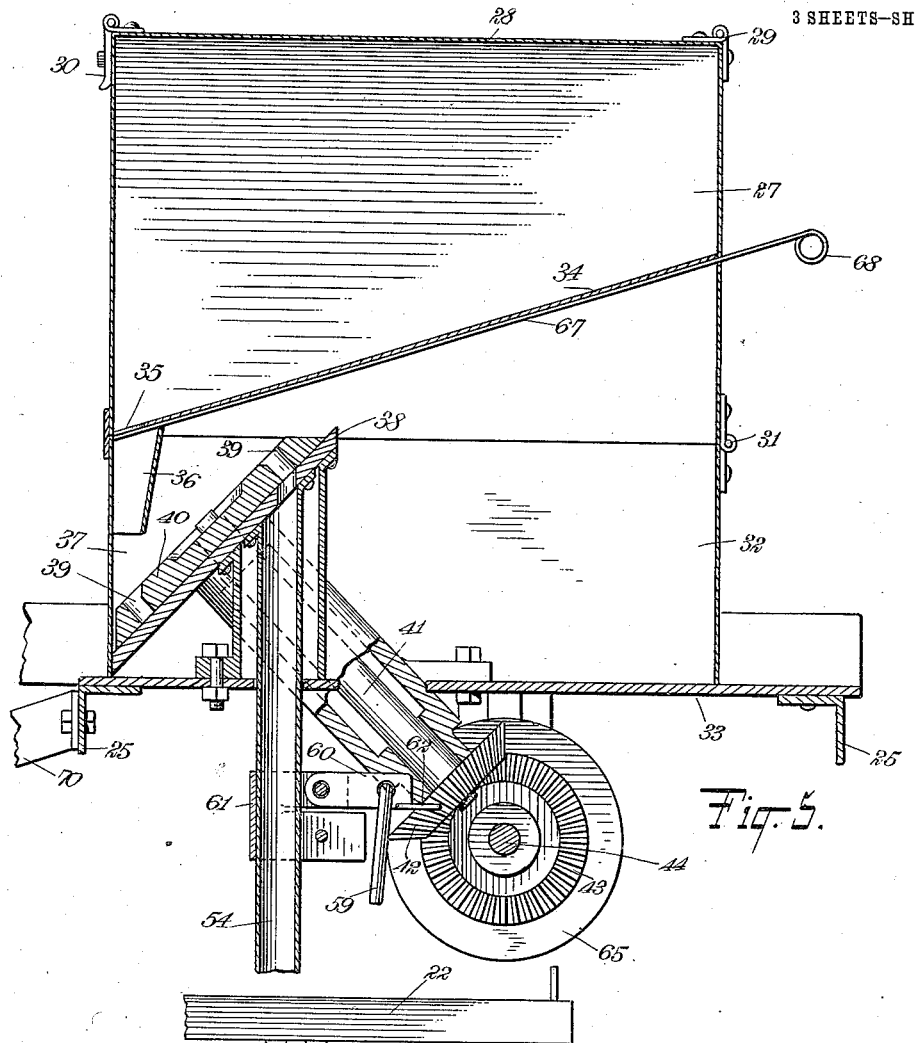
Figure 6:
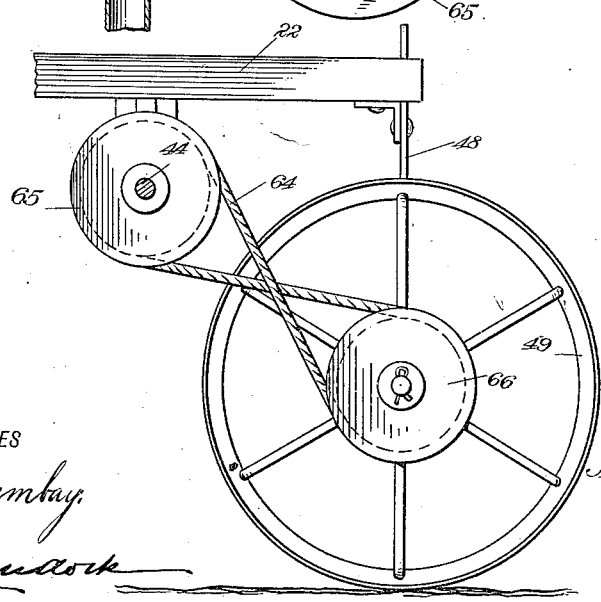

Figure 1 is a side view of a planter constructed and arranged in conformity with the present invention, shown in conjunction with an independent hauling truck of suitable construction; Fig. 2 is a plan view of one end of a planter constructed and arranged in accordance with the present invention, the seed hopper being partly cut away to show the dropper disk and boot opening therefor; Fig. 3 is a rear view of a planter constructed and arranged in accordance with the present invention, the extension bar and driving shaft of said planter being cut away and contracted; Fig. 4 is a cross section taken on the line 4—4 in Fig. 3, the boot and drill being partly cut away to show the seed dropping mechanism; Fig. 5 is a detail view on an enlarged scale and in vertical longitudinal section taken on the line 5—5 Fig. 2, showing the seed hopper, dropper disk, delivery chute and driving mechanism for said disk; and Fig. 6 is a detail view on an enlarged scale, showing a carrying wheel for the planter and means connecting the same with the driving shaft of the planter mechanism.

The planter herein shown, described and claimed is a separate and independent implement adapted for attachment to any other suitable implement or truck, to be operated as a trailer to said truck. The advantage of such a construction is obvious, as it enables the planter to be used in conjunction with any other suitable farm implement. As an instance of the desirability of such an arrangement it will be conceived that to attach a planter thus constructed to follow gang plows or harrows would serve to shorten the operation of preparing the field by just so much time, cost and labor as would be needed to plant the field after the bed had been prepared, as is the present custom.

In the present disclosure there is shown a sulky truck having carrying wheels 11 rotatably mounted on the axle ends 12 of an arch 13. The truck is provided with a tongue 14 from which is hung a loop staple 15. The loop 15 is provided to receive the end of a hook rod 16, the lower end whereof is pivotally engaged with a clamp clip 17. The clip 17 is formed on the end of a hitching block 18 to which is pivotally mounted a vertical clevis 19. The rear end of the hitching block 18 is provided with a head 20 extended between the yokes 21 of a tongue 22, and is pivotally connected thereto by means of a bolt 23. To brace the tongue 22 in position there is provided a tie rod 24. The tongue 22 is connected with the extension bar 25 of the planter, being secured thereto by means of bolts 26. It will be understood that the tongue 22 may be substituted for any connecting or hauling device equally suitable for the purpose of drawing the planter after the vehicle shown in Fig. 1 or other suitable traction device.

The planter is provided with the extension or cross bar 25 of any suitable length, preferably provided at each end with seed carrying, drilling and dropping mechanism, and also provided with a check wire operating mechanism or a driving shaft and mechanism for operating the same by employing a check wire of usual construction. The mechanism for carrying, dropping and planting the seed being the same at each end of the extension bar 25 there will be described only one of the said mechanisms.

The grain is carried in the seed hopper 27. The hopper 27 is provided with a cover 28 hinged at 29. At one side of the cover it is provided with a latch 30. The hopper is rectangular in shape, as seen in Fig. 1 of the drawings, and is pivotally connected by means of hinges 31 with the frame 32. The frame 32 is fixedly mounted upon a skeleton frame 33 which is supported by the extension bars 25. The hopper 27 is provided with a bottom 34, inclined as shown best in Fig. 5 of the drawings. At the lower end of the bottom 34 is provided an opening 35 disposed above a chute 36. The chute 36 is open-ended and delivers into a triangular space 37 formed by the lateral sides of the frame 32 and the inclined base plate 38. The seed by means of this construction are maintained in the triangular space 37 adjacent the lower opening of the chute 36 at a certain and constant level. In this manner it is insured that the pockets 39 formed in the disk 40 shall receive its proper charge of the seed being handled. The disk 40 is fixedly mounted upon a shaft 41. The shaft 41 is inclined, as seen best in Fig. 5 of the drawings, and has fixedly mounted at the lower end thereof a miter gear wheel 42. The gear wheel 42 is meshed with a miter gear wheel 43, which is fixedly mounted on a driving shaft 44. By reason of this construction and arrangement of the wheels 42 and 43, shaft 41 and disk 40, when the said shaft is rotated the disk 40 is rotated in unison therewith.

It is to rotate the shaft 44 that there is provided a forked lever 45. The lever 45 is loosely mounted on the shaft 44 at the ends thereof, the frame and ends of the shaft being extended beyond the carrying wheels of the said planter to receive the operating wire A. The wire A, as is usual in this class of machinery, is provided at intervals with buttons B which engage the sides of the yoke end 46 of the lever 45. The wire A being anchored, as is usual in this operation, forces the lever 45 backward, as shown best in Fig. 1 of the drawings. The lever 45 is extended below the shaft 44, and is there engaged by a spiral spring 47 which is anchored to the framing member 48 employed to support the carrying cover wheel 49. The lever 45 is loosely mounted on the shaft 44, and is normally rotated about the said shaft to resume the position where the lever rests on the extension bar 25 at the forward side of the machine, and in which position the yoke end 46 is disposed adjacent the guide spools 50 between which the wire is guided. When the buttons B engage the yoke end 46 the lever is thrown backward until the button is pulled from engagement with the yoke end 46, which position is adjacent the guide spools 51, at the rear of the machine, when the spring 47 immediately returns the lever to its initial position. This action rocks the lever 45 slightly more than one-third of a complete circle. The lever 45 is provided with a pawl 52 pivotally mounted on the side thereof to engage the teeth formed on a ratchet plate 53. The ratchet plate 53 is fixedly mounted on the shaft 44, hence the engagement of the pawl 52 operates to rotate the shaft 44 through a predetermined arc of movement, causing thereby the disk 40 to rotate, the motion being transmitted through the interposed transmission gear wheels and shaft 41. By rotating the disk 40 the pockets 39 are successively disposed above the chute 54. The chute 54 extends within the boot 55, and is normally closed at the lower end by a gate 56. The gate 56 is pivotally mounted at 57, and is provided with a bracket extension 58 which is connected by means of a pull rod 59 with a pivoted arm 60. The arm 60 is pivotally connected with a clamping sleeve 61 which is mounted on the chute 54. The arm 60 is provided with a foot plate 62 under which the pins 63 strike to lift the said plate and arm 60, pull rod 59 and bracket 58, and thereby rock to open position the gate 56. The pins 63, as best seen in Fig. 4 of the drawings, are fixedly mounted upon the shaft 44 to rotate therewith.

By the operation of the mechanism above described it will be noted that at regular intervals in the progression of the planter, and in accordance with the spacing of the buttons B on the check wire A, seed are delivered from the space 37 below the chute 36 as contained in the pockets 39 above the chute 54, to be deposited at the lower end thereof and to be delivered therefrom when and as the gate 56 is open by the rotation of the shaft 44.

When the planter is used and operated independent of the wire A the shaft 44 is rotated, and constantly, by means of a belt 64, as seen in Fig. 6 of the drawings. It is to receive the belt 64 that the shaft 44 is provided with a fixed pulley 65. The carrying cover wheel 49 is also provided with a driving pulley 66. The ratio of the diameters of the pulleys 65 and 66 establish the relative rate of rotation of the shaft 44 to the wheel 49.

The flow of seed from the hopper 27 into the chute 36 is controlled by a slide 67. The slide 67 is provided with a handle 68 extended beyond the side of the hopper.

The planter is provided with a plow or furrow opener 69, which is held in position by the boot 55 and the brace 70, in a manner similar to the usual construction.

Having thus described my invention, what I claim as new and desire to secure by Letters Patent is:—

1. A planter, comprising a frame having box-like structures mounted thereon, hoppers on the box-like structures and having cut-offs in their bottoms, a chute extending into each box-like structure, a seed feeding mechanism in each box-like structure below the bottom of the hopper for delivering the seed to the chute, a gate in the lower end of each chute, a furrow opener in front of each chute, supporting wheels at the rear of the frame, means for operating the seed feeding mechanisms, and means for operating the gates from the operating means of the seed feeding mechanisms.

2. In a planter, a seed hopper comprising a lower box-like structure having a triangular seed receptacle at one end, an upper box portion hingedly connected to the lower box-like structure and provided with an inclined bottom having a discharge opening at its lower end, a chute in the seed receptacle of the lower box-structure and registering with the opening of the inclined bottom, and a slide for closing the opening of said bottom, an inclined seed dropping disk in the seed receptacle of the lower box-like structure, and means for operating the said disk.

3. In a planter, a frame, a box-like structure on the frame, a hopper mounted on the structure and having an inclined and apertured bottom, an inclined plate in the box-like structure below the lower apertured end of the bottom of the hopper, said plate having an opening adjacent to its upper end and forming with the end of the box-like structure a seed receptacle, a chute leading from the opening of the said inclined plate, an inclined shaft having one end mounted in the inclined plate, an apertured seed disk mounted on the inclined shaft and in engagement with the inclined plate, a driving shaft, and gearing between the driving shaft and the inclined shaft.

4. In a planter, a frame, a box-like structure on the frame, a hopper mounted on the structure and having an inclined bottom provided with an aperture at its lower end, a cut-off for said opening, an inclined plate in the box-like structure adjacent to one end thereof and forming a triangular seed receptacle, said plate being provided with an aperture near its upper end, an inclined shaft having one end mounted in the inclined plate, an apertured seed disk on the inclined shaft and in engagement with said inclined plate, a driving shaft, means for operating the inclined shaft from the driving shaft, and a seed spout secured to the inclined plate around the opening thereof.

5. In a planter, a frame, a hopper, a delivery chute, a feed mechanism for delivering the seed to the chute, a driving shaft provided with a plurality of radial pins, means for operating the feed mechanism from the driving shaft, a pivoted gate in the chute, an arm pivoted to the chute and adapted to be engaged by the pins of the shaft, and a link connecting the arm with the gate.

In testimony whereof I have signed my name to this specification in the presence of two subscribing witnesses.

ALFRED RITCHIE BALDWIN.

Witnesses:
W. M. BALDWIN,
GEO. L. FLETCHER.

---

Copies of this patent may be obtained for five cents each, by addressing the "Commissioner of Patents, Washington, D. C."